United States Patent

Stachowiak

[11] Patent Number: 5,879,723
[45] Date of Patent: Mar. 9, 1999

[54] AUTOMATED TUBE REFORMING APPARATUS

[75] Inventor: Robert S. Stachowiak, Commerce, Tex.

[73] Assignee: United States Brass Corporation, Dallas, Tex.

[21] Appl. No.: 622,061

[22] Filed: Mar. 26, 1996

[51] Int. Cl.⁶ ................................................. B29C 51/22
[52] U.S. Cl. .......................... 425/384; 264/320; 264/322; 425/150; 425/392; 425/397; 425/403; 425/403.1; 425/DIG. 200; 425/DIG. 218
[58] Field of Search ..................... 425/138, 193, 425/150, 161, 170, 384, 392, 593, 394, 403, 397, 403.1, DIG. 218, DIG. 200; 264/296, 322, 320

[56] References Cited

U.S. PATENT DOCUMENTS

| | | |
|---|---|---|
| 1,128,156 | 2/1915 | Lamb . |
| 1,731,988 | 10/1929 | Skillman . |
| 2,699,575 | 1/1955 | Haury . |
| 2,706,319 | 4/1955 | Lacy et al. ............. 425/DIG. 218 |
| 2,974,367 | 3/1961 | Doering et al. . |
| 3,047,910 | 8/1962 | Downs . |
| 3,102,303 | 9/1963 | Lainson . |
| 3,205,289 | 9/1965 | Carpenter ..................... 264/280 |
| 3,270,117 | 8/1966 | Hobson ........................ 264/320 |
| 3,360,826 | 1/1968 | Lorang . |
| 3,370,118 | 2/1968 | Lowe ........................... 264/325 |
| 3,418,409 | 12/1968 | Hesse et al. .................. 264/230 |
| 3,448,491 | 6/1969 | Sosnowski, Jr. et al. . |
| 3,495,301 | 2/1970 | Stephens et al. . |
| 3,509,252 | 4/1970 | Baehr .......................... 264/296 |
| 3,509,599 | 5/1970 | Driza et al. . |
| 3,557,278 | 1/1971 | Kuhlemann .................. 264/318 |

(List continued on next page.)

FOREIGN PATENT DOCUMENTS

| | | |
|---|---|---|
| 733643 | 3/1943 | Germany . |
| 2205586 | 8/1973 | Germany . |
| 2248471 | 4/1974 | Germany . |
| 2733643 | 2/1979 | Germany . |
| 2836798 | 3/1980 | Germany . |
| 2940719 | 4/1981 | Germany . |
| 3929326 | 3/1991 | Germany . |

(List continued on next page.)

OTHER PUBLICATIONS

"Examination of Cross Linked Polyethylene for Heating Systems", Rarosen & JE Bergman.
"Water and Pipes", pp. 31–33.
"HIS 311 Schiebehülse" pp. 3–44 Technische Informaton.
"System Components JRG Sanipex Pipes Planning and Installation Guide" Handbook 88–1, JRG Sanipex.
"Pipes for Floor–Heating and Domestic Hot Water Supply" Golan Plastic Products.

(List continued on next page.)

Primary Examiner—Jay H. Woo
Assistant Examiner—Joseph Leyson
Attorney, Agent, or Firm—Catherine E. Bracken; Marlin R. Smith; J. Richard Konneker

[57] ABSTRACT

A tube reforming apparatus provides efficient mass production of reformed tube end portions. In a preferred embodiment, a tube reforming apparatus has a loading station, two heating stations, a forming station, and an unloading station. The loading station permits rapid loading of a series of laterally spaced apart tubes into clamping fixtures, and accurately meters a downwardly extending end portion of each tube. The heating stations permit accurate and evenly distributed heat to be applied to the end portions to make them pliable. The forming station reforms the end portions between a mating die pair, while compensating for any volume variation in the end portions. The unloading station automatically unloads the tubes from the clamping fixtures. Automation features of the apparatus permit these operations to be efficiently accomplished.

33 Claims, 11 Drawing Sheets

U.S. PATENT DOCUMENTS

| | | | |
|---|---|---|---|
| 3,599,287 | 8/1971 | Buck et al. | |
| 3,601,852 | 8/1971 | Bjahme | |
| 3,672,804 | 6/1972 | Dalik | 425/328 |
| 3,755,524 | 8/1973 | McKay | 264/138 |
| 3,806,301 | 4/1974 | Osterhagen et al. | 425/393 |
| 3,823,216 | 7/1974 | Petzetakis | |
| 3,843,300 | 10/1974 | McFarlane | 425/384 |
| 3,852,015 | 12/1974 | Stansbury | 425/DIG. 218 |
| 3,861,847 | 1/1975 | Barnett | 425/392 |
| 3,884,612 | 5/1975 | Parmann | 425/DIG. 218 |
| 3,899,565 | 8/1975 | de Putter et al. | 264/296 |
| 3,910,744 | 10/1975 | Ronden et al. | 425/384 |
| 3,923,947 | 12/1975 | Cook | 264/141 |
| 3,929,943 | 12/1975 | Klimaszewski, Jr. | |
| 3,932,094 | 1/1976 | Korff et al. | 425/DIG. 218 |
| 3,982,871 | 9/1976 | Möddel | 425/393 |
| 3,986,810 | 10/1976 | La Branche et al. | 425/393 |
| 4,005,968 | 2/1977 | Crawford | 425/DIG. 218 |
| 4,028,037 | 6/1977 | Dawson | 425/392 |
| 4,059,379 | 11/1977 | Korff et al. | 425/393 |
| 4,065,243 | 12/1977 | Acda et al. | 425/393 |
| 4,083,918 | 4/1978 | Ronden et al. | 264/297 |
| 4,102,623 | 7/1978 | Mathison | 425/393 |
| 4,107,249 | 8/1978 | Murai et al. | 264/68 |
| 4,113,813 | 9/1978 | Wilson | |
| 4,117,195 | 9/1978 | Swarbrick et al. | 428/379 |
| 4,131,407 | 12/1978 | de Putter et al. | 425/393 |
| 4,140,739 | 2/1979 | Cotten | 264/138 |
| 4,167,388 | 9/1979 | Keelor et al. | 425/387.1 |
| 4,219,525 | 8/1980 | Greenspan | 264/296 |
| 4,264,661 | 4/1981 | Brandolf | 428/36 |
| 4,269,801 | 5/1981 | Klasema et al. | 264/156 |
| 4,271,218 | 6/1981 | Heckel et al. | 428/36 |
| 4,276,010 | 6/1981 | Shartzer | 425/143 |
| 4,279,853 | 7/1981 | Ohta et al. | 264/230 |
| 4,289,716 | 9/1981 | Voigt | 264/45.9 |
| 4,316,870 | 2/1982 | Rowley | 264/296 |
| 4,323,337 | 4/1982 | Korff et al. | 425/155 |
| 4,333,898 | 10/1982 | Schmidtchen | 264/45.9 |
| 4,345,956 | 8/1982 | Cox et al. | 156/198 |
| 4,379,115 | 4/1983 | Seach et al. | 264/296 |
| 4,383,966 | 5/1983 | Svetlik | 264/296 |
| 4,394,343 | 7/1983 | Acda et al. | 264/296 |
| 4,404,159 | 9/1983 | McFarlane | 264/296 |
| 4,406,852 | 9/1983 | Riegel | 264/296 |
| 4,426,497 | 1/1984 | Kent | 525/194 |
| 4,428,900 | 1/1984 | Riley et al. | 264/526 |
| 4,446,084 | 5/1984 | Rowley | 264/40.6 |
| 4,446,283 | 5/1984 | Doi et al. | 525/344 |
| 4,457,886 | 7/1984 | Acoa et al. | 264/249 |
| 4,525,136 | 6/1985 | Rowley | 425/384 |
| 4,525,319 | 6/1985 | Kaspe | 425/392 |
| 4,664,423 | 5/1987 | Rowley | 285/256 |
| 4,803,033 | 2/1989 | Rowley | 264/339 |
| 4,857,250 | 8/1989 | Gale et al. | 264/83 |
| 4,891,173 | 1/1990 | Saitoh et al. | 264/22 |
| 4,902,460 | 2/1990 | Yagi et al. | 264/83 |
| 4,907,958 | 3/1990 | Jones | 425/393 |
| 5,244,622 | 9/1993 | Rumberger | 264/319 |
| 5,505,900 | 4/1996 | Suwanda et al. | 264/477 |
| 5,514,312 | 5/1996 | Hardy et al. | 264/40.3 |

FOREIGN PATENT DOCUMENTS

| | | |
|---|---|---|
| 4135017 | 4/1993 | Germany |
| 4423372 | 1/1996 | Germany |
| 53-56241 | 5/1978 | Japan |
| 56-150511 | 11/1981 | Japan |
| 57-008110 | 1/1982 | Japan |
| 4-198201 | 7/1992 | Japan |
| 5-156032 | 6/1993 | Japan |
| 877735 | 9/1961 | United Kingdom |
| 1336869 | 11/1973 | United Kingdom |

OTHER PUBLICATIONS

"Methods and Benefits of Crosslinking Polyolefins for Industrial Applications" By: Colin Beveridge & Andrew Sabiston AEI Compounds.

Panzer, L.M. "Advances in Silane Crosslinking of Polyethylene" Union Carbide.

"Polymer Crosslinking with Union Carbide Organofunctional Silane A–171" 1992 Union carbide.

Standard Specification for Crosslinking Polyethylene (PEX), 1993, Plastic Hot and Cold Water Distribution Systems by ASTM Committee F–17.

"Standard Specification for crosslinked Polyethylene (PEX) Tubing" by ASTM Committee F–17, Mar. 1993.

AUTOMATED TUBE REFORMING APPARATUS

BACKGROUND OF THE INVENTION

The present invention relates generally to reforming of end portions of tubes and, in a preferred embodiment thereof, more particularly provides an automated tube reforming apparatus and associated methods of manufacturing.

The reforming of end portions of tubes is well known in the art. In particular, where a tube is made of a thermoplastic material, it is well known to reform an end portion of the tube by heating the end portion to an elevated temperature and then reforming the end portion by imparting a desired shaped to it using a die or mating dies.

Disclosures of tube reforming apparatus and methods may be found in U.S. Pat. Nos. 3,509,252 to Baehr; 3,047,910 to Downs; 3,557,278 to Kuhlemann; 3,823,216 to Petzetakis; 3,899,565 to de Putter et al.; 4,345,956 to Cox et al.; 3,418,409 to Hesse et al.; 4,083,918 to Ronden et al.; 5,244,622 to Rumberger et al.; 4,219,525 to Greenspan; 3,986,810 to La Branch et al.; 4,404,159 to McFarlane; 4,028,037 to Dawson; 3,755,524 to McKay; 3,672,804 to Dalik; and 4,316,870, 4,446,084, and 4,525,136 to Rowley. However, none of these U.S. patents disclose a satisfactory method of automating a tube reforming process so that the process may be economically and safely carried out at a high rate of production.

Where heated air is used to heat tube end portions, high rates of production require that the tube end portions be quickly heated to a consistent, uniform, and reproducible desired temperature prior to reforming the tube end portions. Precise control of tube heating during an end portion reforming process is not disclosed in any of the above listed U.S. patents. Furthermore, none of the above listed U.S. patents discloses a satisfactory method of simultaneously heating multiple tube end portions to a desired temperature using heated air.

From the foregoing, it can be seen that it would be quite desirable to provide an automated tube reforming apparatus which permits multiple tube end portions to be quickly and consistently heated to an elevated temperature utilizing heated air, which is capable of simultaneously reforming multiple heated tube end portions, and which permits such operations to be accomplished at a high rate of production. It is accordingly an object of the present invention to provide such an automated tube reforming apparatus and associated methods of manufacturing.

SUMMARY OF THE INVENTION

In carrying out the principles of the present invention, in accordance with an embodiment thereof, a tube reforming apparatus is provided which permits economical mass production of reformed tubes. The apparatus and associated methods efficiently load tubes, heat end portions of the tubes, reform end portions of the tubes, and unload the tubes from the apparatus.

In broad terms, apparatus for reforming an end portion of a tube is provided. In an illustrated embodiment, the apparatus includes a supporting frame structure, a table structure, a table indexing mechanism, a male die, a tube clamping device, a tube loading station, a tube end portion heating station, and a tube end portion forming station.

The table structure is attached to the frame structure such that the distance between the frame and table structures is constant. The table indexing mechanism displaces the table structure in a parallel direction relative to the frame structure. In an illustrated embodiment, the table indexing mechanism rotates the table structure relative to the frame structure.

The male die is mounted to the table structure and is capable of axially receiving the tube therein. In an illustrated embodiment, the male die is mounted so that its axis is orthogonal to the table structure. The clamping device is also mounted to the table structure and is capable of axially securing the tube relative to the male die.

The loading station has a surface which is attached to the frame structure. The surface is axially spaced apart from, and axially aligned with, the male die when the table indexing mechanism positions the table structure so that the male die is at the loading station. In this way, the tube end portion may be extended axially outward from the male die to contact the surface before the clamping device secures the tube in the male die, thereby precisely metering the amount of the tube extending from the male die.

The heating station includes a means for heating the tube end portion attached to the frame structure. The heating means is axially aligned with the male die when the table indexing mechanism positions the table structure so that the male die is at the heating station. In an illustrated embodiment, the heating means is positioned adjacent the tube end portion when the male die is at the heating station, and is retracted when the table indexing mechanism displaces the male die.

The forming station includes an axially displaceable female die attached to the frame structure. When the table indexing mechanism displaces the table structure so that the male die is at the forming station, the female die is axially aligned with the male die, and the female die may cooperatively engage the male die to thereby reform the tube end portion. In one embodiment of the present invention, an unloading station follows the forming station in sequence, at which station the tubes are unclamped and may be removed from the apparatus.

In another aspect of the present invention, apparatus for rotatably indexing a table structure relative to a frame structure about a pivot member is also provided. The rotatably indexing apparatus includes multiple locks, a first actuator, and a second actuator.

The locks are circumferentially spaced apart and are attached to a side surface of the table structure facing the frame structure. In an illustrated embodiment, there are five locks evenly spaced apart, each of which corresponds to a station of the apparatus.

The first actuator is pivotably attached to the pivot member between the table and frame structure facing side surfaces. The first actuator has a radially extendable member. In one position of the first actuator, the member cooperatively engages one of the series of locks. In another position, the member is disengaged from the locks. Thus, the first actuator may be pivoted with the table structure, or may pivot relative to the table structure depending upon whether the member is engaging one of the locks.

The second actuator is pivotably attached to the facing side surface of the frame structure and is also pivotably attached to the first actuator. The second actuator has a retracted position and an extended position. The second actuator is capable of rotating the first actuator about the pivot member to align the member with one of the series of locks when the member is disengaged from the locks, and the second actuator is capable of rotating the table structure relative to the frame structure when the member is engaging one of the locks.

In a further aspect of the present invention, apparatus for metering an axially outwardly extending length of a tube is also provided. The apparatus includes a fixture, a clamp member, an actuator and a pivoting attachment.

The fixture has an axially extending opening formed therethrough for receiving the tube therein, and an axially elongated lateral opening formed through the fixture which intersects the axial opening. The clamp member is cooperatively disposed in the lateral opening and is laterally slidable therein. In a first position, the clamp member intersects the axial opening and is capable of applying a lateral clamping force to the tube. In a second position, the clamp member is laterally spaced apart from the axial opening and the tube is free to axially displace within the axial opening.

The clamp member has first and second opposite side surfaces. The first side surface is disposed in the axial opening when the clamp member is in the first position. The first side surface has an axially extending recess formed thereon which is complementarily shaped relative to the tube outer side surface. Thus, the axial recess complementarily engages the tube outer side surface when the clamp member is in the first position.

The actuator has a laterally extendable member with extended and retracted positions relative to the actuator. The pivoting attachment is attached to the laterally extendable member and to the clamp member, such that when the laterally extendable member is in the extended position the clamp member is in the first position and when the laterally extendable member is in the retracted position the clamp member is in the second position. The pivoting attachment permits the axial recess to cooperatively align with the tube outer side surface for clamping engagement therewith when the clamp member is in the first position.

In yet another aspect of the present invention, apparatus for heating each end portion of multiple laterally spaced apart tubes with a stream of heated air is also provided. The tube heating apparatus includes a manifold, multiple nozzles, and an alignment member.

The manifold has an air inlet opening formed thereon for receiving the stream of air therein. Multiple laterally spaced apart air outlet openings are formed thereon for exhausting the stream of air therefrom, each of the outlet openings having an internal diameter. Multiple internal air passageways each permit fluid communication between the inlet opening and one of the outlet openings.

The nozzles are laterally spaced apart and each of the nozzles has an internal air passageway formed therethrough. First and second external diameters are formed on each of the nozzles, the first external diameter being less than the outlet opening internal diameter, and the second external diameter being greater than the outlet opening internal diameter. Each of the first external diameters is received in one of the outlet opening internal diameters. Each of the internal air passageways directs the air to flow onto one of the tubes.

The alignment member has a laterally spaced apart series of nozzle openings formed therethrough, each of the nozzle second external diameters being received in one of the nozzle openings. Each of the nozzle openings substantially restricts lateral displacement of a corresponding one of the nozzles relative to the other nozzles. The alignment member is made of a material having a coefficient of thermal expansion substantially less than the coefficient of thermal expansion of the manifold so that the nozzles continue to direct the air to flow onto the tubes when the manifold expands due to the heated air flowing therethrough.

A method of heating an end portion of a tube is also provided. The tube is releasably secured to a fixture with the end portion extending outwardly therefrom. The fixture is laterally displaced, then held in a fixed position for a predetermined period, and then laterally displaced away from the fixed position. The method includes the steps of providing a blower, a heater, a nozzle, a supporting structure, and a mounting means, positioning the nozzle, displacing the nozzle, and maintaining the nozzle's position.

The blower produces a stream of air. The heater is connected to the blower and heats the stream of air. The nozzle is connected to the heater and directs outward flow of the stream of air. The supporting structure is adjacent the fixture fixed position. The mounting means mounts the nozzle to the structure.

The nozzle is movable relative to the fixture between first and second positions. When the nozzle is in the first position it is adjacent the fixture fixed position, and when the nozzle is in the second position it is spaced apart from the fixture fixed position.

The nozzle is positioned to direct the stream of air so that it impinges upon the tube end portion when the fixture is in the fixed position and the nozzle is in the first position. The nozzle is displaced to the first position when the fixture is in the fixed position. The nozzle is maintained in the second position when the fixture is being displaced.

In still another aspect of the present invention, apparatus for reforming an end portion of a tube is provided. The apparatus includes a male die member, a first structure, a female die member, a second structure, a first actuator, a second actuator, and a controller.

The male die member has an axially extending opening formed therethrough for receiving the tube axially therein. The end portion extends axially outwardly from the axial opening. The first structure is attached to the male die member, and alternately displaces the male die member and maintains the male die member stationary.

The female die member has a profile formed thereon for cooperative engagement with the male die member to reform the end portion of the tube. The second structure is attached to the female die member and is laterally displaceable between a first position in which the female die member is axially aligned with the male die member when it is stationary, and a second position in which the female die member is not axially aligned with the male die member.

The first actuator is attached to the second structure. The first actuator having one position in which the second structure is disposed in the first position, and another position in which the second structure is disposed in the second position. The first actuator may be activated to displace the female die member laterally with respect to the male die member.

The second actuator is carried by the second structure and is attached to the female die member. The second actuator has one position in which the female die member is axially spaced apart from the male die member, and another position in which the female die member axially cooperatively engages the male die member.

The controller controls the first and second actuators so that the first actuator displaces the second structure to the first position only when the male die member is stationary, and so that the second actuator cooperatively engages the female die member with the male die member only when the first actuator displaces the second structure to the first position.

In yet another aspect of the present invention, a method of forming a sealing surface and a radially outwardly extending shoulder on an end of a tube having an inner diameter and a variable wall thickness is provided. The method includes the steps of inserting the tube through an axially extending opening formed through a male die having a generally planar annular surface formed on an end thereof orthogonal to the male die opening, extending the tube end axially outwardly from the annular surface a predetermined distance, clamping the tube such that the tube end is axially secured at the predetermined distance from the annular surface, heating the tube end such that the tube end is deformable, deforming the tube end by axially engaging the male die with a cooperatively shaped female die having an axially extending interior recess formed thereon and an axial projection disposed within the recess, such that when the female die is engaged with the male die, the male die end is received in the female die recess and the axial projection enters the tube inside diameter, the recess being shaped such that the sealing surface is formed on the tube end when the male die is engaged with the female die, and the shoulder being formed on the tube end by the annular surface when the male die is engaged with the female die, the sealing surface being axially spaced apart from the shoulder by a distance that can vary somewhat depending on the tube wall thickness.

The use of the disclosed apparatus and associated methods enables efficient production of reformed tubes. The tube loading station permits an operator to quickly and accurately load tubes in the apparatus and meter the projecting end portions of the tubes. The heating station quickly and evenly heats the end portions of the tubes. The forming station precisely reforms the end portions of the tubes while compensating for variations in wall thicknesses of the tubes. The unloading station automatically releases the tubes from the apparatus, so that the apparatus may again be loaded with tubes.

DETAILED DESCRIPTION

Figure 1:
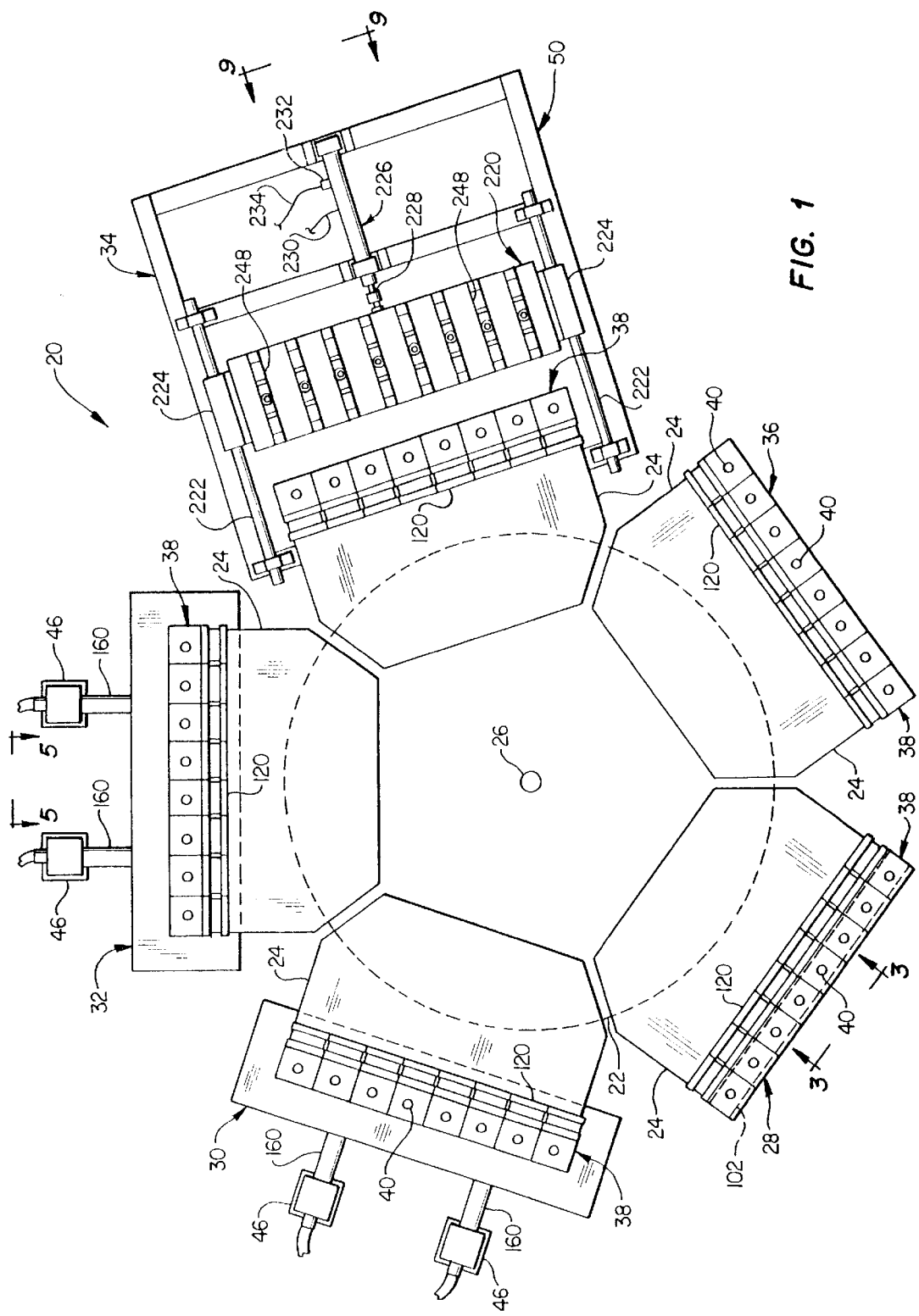
FIG. 1 is a top plan view of a tube reforming apparatus embodying principles of the present invention.

Illustrated in FIG. 1 is a tube reforming apparatus 20 which embodies principles of the present invention. FIG. 1 shows a top plan view of the apparatus 20 with several portions not shown for purposes of clarity of illustration. Apparatus 20 includes a generally planar and circular table structure 22 and radially outwardly extending table extensions 24 mounted thereto. Although the apparatus 20 is representatively illustrated as having table 22 horizontally disposed and having five table extensions, it is to be understood that table 22 may be otherwise disposed and more or less extensions may be utilized without departing from the principles of the present invention.

During operation of the apparatus 20, which will be more fully described hereinbelow, table 22 is rotated about a pivot member 26. Such rotation of table 22 laterally displaces a series of tube clamps 38 mounted to each of the extensions 24 to successive circumferentially spaced apart stations of the apparatus 20. As representatively illustrated, apparatus 20 includes five such stations: a loading station 28, a first heating station 30, a second heating station 32, a forming station 34, and an unloading station 36. It is to be understood that, in other embodiments of the present invention, there may be more or less stations. For example, there may be only one heating station and the loading and unloading stations may be combined into a single station without departing from the principles of the present invention.

It will also be readily apparent to one of ordinary skill in the art, that each of the series of tube clamps 38 could be laterally transported to successive stations 28,30,32,34,36 by a table which moves linearly, instead of rotating, in which case the stations may be laterally aligned. In that case, table 22 would not rotate about pivot 26, but may, for example, be carried on linear bearings. Other arrangements of table 22 and stations 28,30,32,34,36 are likewise possible without departing from the principles of the present invention.

Each series of tube clamps 38 are loaded with tubes 40 at the loading station 28. In a preferred embodiment, the tubes 40 are made of a plastic material. Applicant prefers polybutylene for the material of the tubes 40, although other plastic materials, such as cross-linked polyethylene, polyethylene, and polypropylene, may be utilized in the apparatus 20.

Figure 11:
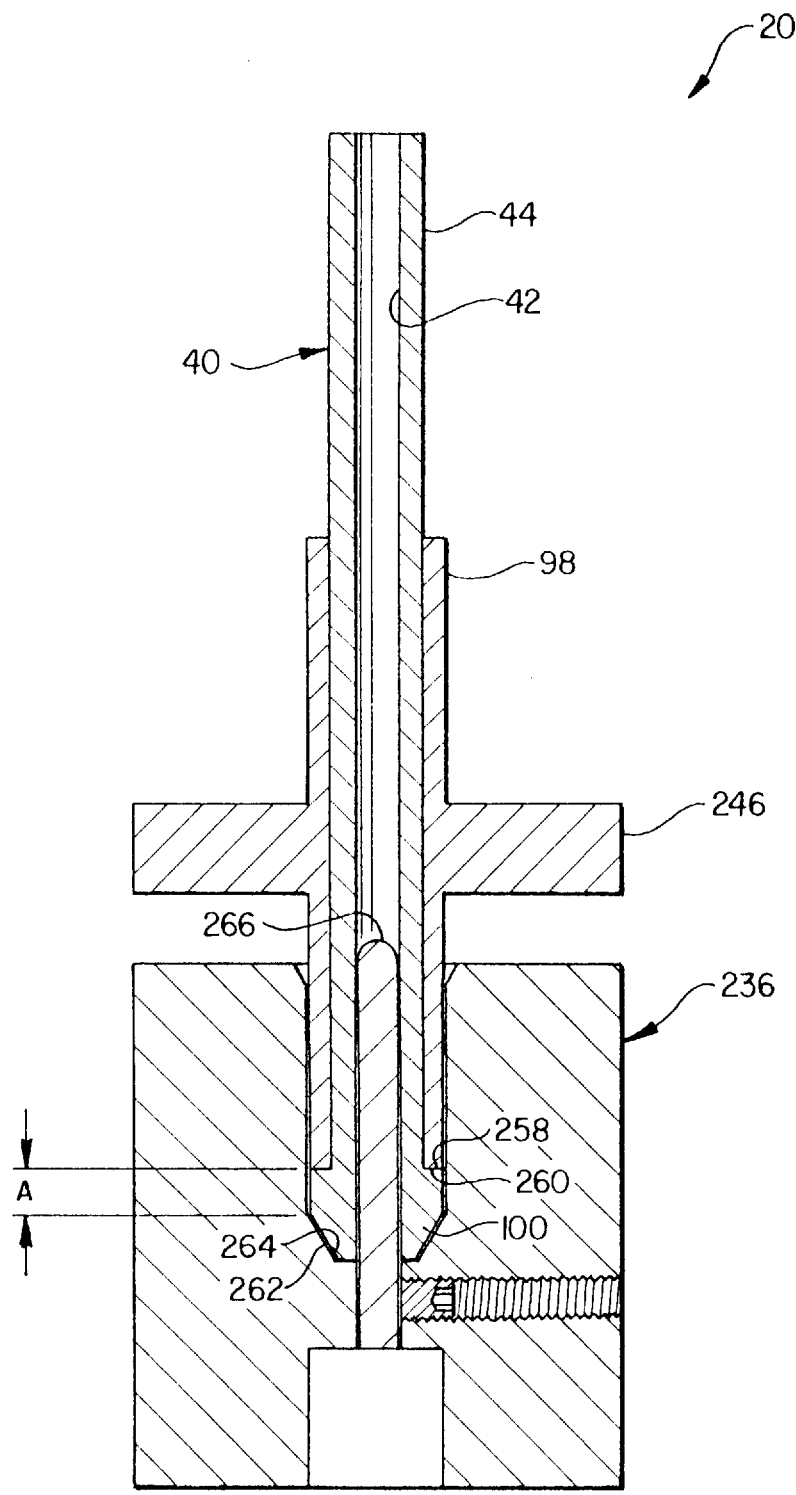
FIG. 11 is a cross-sectional view of a tube being formed between a mating die pair at the forming station, taken along line 11—11 of FIG. 9.

Each of the tubes 40 has an inner diameter 42, an outer diameter 44, and a wall thickness therebetween (see FIG. 11). Due to manufacturing tolerances, etc., it is common for commercially available tubes 40 to vary with respect to these dimensions. It is a unique feature of the present invention that the apparatus 20, and, in particular, the forming station 34, compensates for such dimensional variations among tubes 40, as will be more fully described hereinbelow.

After the tubes 40 are loaded into a series of tube clamps 38, table 22 is rotated to position the tube clamps at the first heating station 30. Heaters 46 at the first heating station 30 elevate the temperature of air flowing through the first heating station. The heated air is then directed to flow onto the tubes 40, thereby causing the tubes to become pliable so that they may be reformed.

After the tubes 40 have been heated at the first heating station 30, the table 22 is rotated to position the tube clamps 38 at the second heating station 32. The second heating station 32 performs the same operation as heating station 30 in the illustrated embodiment of the apparatus 20. Applicant has chosen to utilize the additional heating station 32 to ensure that the tubes 40 are thoroughly and evenly heated prior to being reformed, without delaying the rotational period of the table 22. As previously discussed, fewer or greater numbers of heating stations may be utilized without departing from the principles of the present invention. Due to a unique operation of the first and second heating stations 30,32, which will be more fully described hereinbelow, the heated air is automatically directed to flow onto the tubes 40 when the tubes are positioned at each of the heating stations.

After the tubes 40 have been heated at the second heating station 32, the table 22 is rotated to position the tube clamps 38 at the forming station 34. A pair of mating dies are utilized to reform each of the heated tubes 40 at the forming station 34. According to a unique feature of the apparatus 20 of the present invention, the dies are automatically aligned, axially secured to the tube clamps 38, and the dies engaged to reform the tubes 40, when the tubes are positioned at the forming station 34.

After the tubes 40 have been reformed at the forming station 34, the table 22 is rotated to position the tube clamps 38 at the unloading station 36. At the unloading station 36 the tube clamps 38 are unclamped, permitting the tubes 40 to be unloaded from the apparatus 20. According to a unique feature of the apparatus 20, such unclamping of the tube clamps 38 is automatically achieved when the tube clamps are positioned at the unloading station 36, as will be more fully described hereinbelow.

Due to the extensive automation of the process performed by the apparatus 20, only a single operator is required to operate the apparatus. Additionally, efficient mass production of reformed tubes 40 is made possible by the apparatus 20 and associated methods of the present invention, in part due to the fact that tubes may be loaded at the loading station 28 while other tubes are being heated at the first and second heating stations 30,32, while still other tubes are being reformed at the forming station 34, and while yet other tubes are being unloaded at the unloading station 36.

The remainder of the detailed description of the apparatus 20 will more fully describe particular structural and functional portions of the apparatus. It is to be understood, however, that other implementations of the hereinafter described portions of the apparatus 20 may be utilized without departing from the principles of the present invention. Additionally, in the following descriptions of the portions of the apparatus 20, directional terms, such as "upwardly", "laterally", and "axially", are used to describe the apparatus as it is representatively illustrated in the accompanying drawings, and it is to be understood that other orientations of the portions of the apparatus may be utilized without departing from the principles of the present invention.

Figure 2:
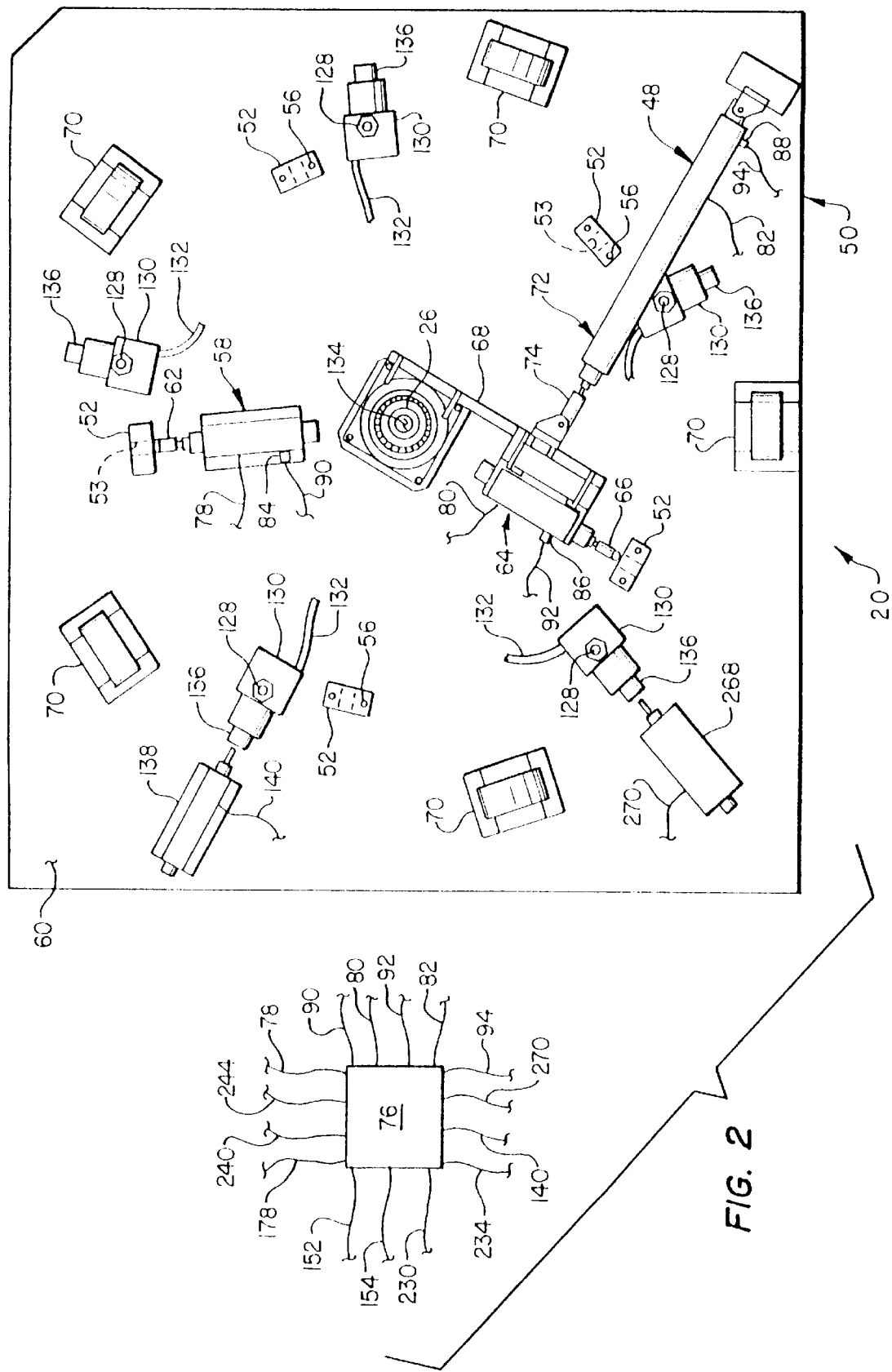
FIG. 2 is a top plan view of a rotary indexing mechanism portion of the tube reforming apparatus.

Referring additionally now to FIG. 2, a rotational table indexing mechanism 48 is representatively illustrated. FIG. 2 shows a top plan view of the mechanism 48 which is disposed beneath the table 22. The mechanism 48 is, at least partially, attached to a frame structure 50 which upwardly supports the table 22. Radially outwardly disposed and circumferentially spaced apart rollers 70 are mounted to the frame 50 and maintain a parallel spaced apart relationship between the table 22 and the frame. Thus, the mechanism 48 is vertically intermediate the table 22 and the frame 50. Portions of the apparatus 20 are not shown in FIG. 2 for illustrative clarity.

A series of downwardly projecting lock m embers 52, each of which has a radially directed opening 53 formed therethrough, are secured to a downwardly facing side surface 54 (see FIG. 3) of the table 22 with fasteners 56. In the illustrated apparatus 20, five locks 52 are provided, corresponding to the five stations 28,30,32,34,36. An actuator 58 is secured to a top side surface 60 of the frame 50 and has a radially extendable member 62. When it is desired to prevent rotation of the table 22 about the pivot 26, member 62 is radially outwardly extended to engage one of the locks 52.

Another actuator 64 is rotatably mounted, for rotation about the pivot 26, intermediate the table 22 and frame 50. A pivot arm 68 secures the actuator 64 to the pivot 26. Actuator 64 has a radially extendable member 66 which is alignable with each of the locks 52. Thus, actuator 64 may rotate with table 22 about pivot 26 when member 66 is engaged with one of the locks 52, or actuator 64 may rotate independently of the table 22 when member 66 is retracted out of engagement with the locks 52.

Yet another actuator 72 is utilized to rotate the actuator 64 about the pivot 26. An extendable member 74 of the actuator 72 is pivotably attached to the pivot arm 68, and the remainder of the actuator 72 is pivotably attached to the frame 50. Thus, when member 74 is extended or retracted while member 66 of actuator 64 is engaged in one of the locks 52, and member 62 of actuator 58 is retracted out of engagement with the locks, the table 22 will rotate about pivot 26 along with actuator 64. Likewise, when member 74 is extended or retracted while member 66 of actuator 64 is retracted out of engagement with the locks, actuator 64 will rotate independently of the table 22.

Operation of the indexing mechanism 48 is a matter of sequentially retracting and extending the members 62,66,74 of the actuators 58,64,72, respectively. With each of the series of tube clamps 38 positioned at one of the stations 28,30,32,34,36 as hereinabove described, each of members 62 and 66 of actuators 58 and 64 may be extended to engage one of the locks 52, thereby preventing rotation of the table 22.

When it is desired to rotate the table 22 so that each of the series of tube clamps 38 may be positioned at the next station in sequence, member 66 is retracted to disengage it from the lock 52, and member 74 is also retracted, such that member 66 is aligned with another one of the locks 52. FIG. 2 shows members 66 and 74 in their retracted positions, with member 66 radially aligned with one of the locks 52 as described. Note, however, that at this point member 62 of actuator 58 would be engaged with one of the locks 52 to prevent rotation of the table 22. At all times either or both of members 62 and 66 are engaged with one of the locks 52 so that the table 22 is not free to rotate independently of both actuators 58 and 64.

After member 66 is radially aligned with another one of the locks 52, member 66 is extended to engage that lock. Member 62 is then retracted out of engagement with the locks 52, permitting rotation of the table 22 with actuator 64 about the pivot 26. Member 74 is extended, thereby rotating table 22 and actuator 64, until member 62 of actuator 58 aligns with another of the locks 52, at which time each of the series of tube clamps 38 will be positioned at the next station 28,30,32,34,36 in sequence. Member 62 is then extended to engage that lock 52, thus preventing further rotation of the table 22. At this point, the above sequence may be repeated to again rotationally index the table 22.

Note that the above described sequence may be reversed to rotate the table 22 in an opposite direction, and that, with member 66 retracted, actuator 64 may be rotated to the next one of the locks 52 before or after it is desired to rotate the table 22. These and other modifications to the above described sequence may be utilized without departing from the principles of the present invention.

The sequence of operation of the actuators 58,64,72 is controlled by a controller, such as a commercial programmable logic controller 76, which is connected to the actuators 58,64,72 via lines 78,80,82, respectively. If actuators 58,64,72, or any of them, are pneumatic or hydraulic, the respective lines 78,80,82 may be connected to solenoid valves (not shown) for supplying and/or exhausting fluid pressure to or from the respective actuators. Sensors, such as reed switches 84,86,88, are mounted to the actuators 58,64, 72, respectively, and connected to the controller 76 via lines 90,92,94, respectively, for determining whether each of the actuators are extended or retracted. In this manner, controller 76 may be programmed to prevent unwanted occurrences, such as extension or retraction of member 74 while both of members 62 and 66 are engaged with locks 52, and the controller may be programmed to operate the actuators 58,64,72 in proper repetitive sequence, an indication being given by sensors 84,86,88 via lines 90,92,94, respectively, when a step has been accomplished, so that the process is automated.

Thus has been described a rotary indexing mechanism 48 which simply, efficiently, automatically, and positively rotates the table 22 so that each of the series of tube clamps 38 is positioned sequentially at each of the stations 28,30, 32,34,36 of the apparatus 20. It is to be understood that each of actuators 58,64,72 may be pneumatic, electrical, mechanical, electromechanical, hydraulic, or otherwise implemented, without departing from the principles of the present invention.

Figure 3:
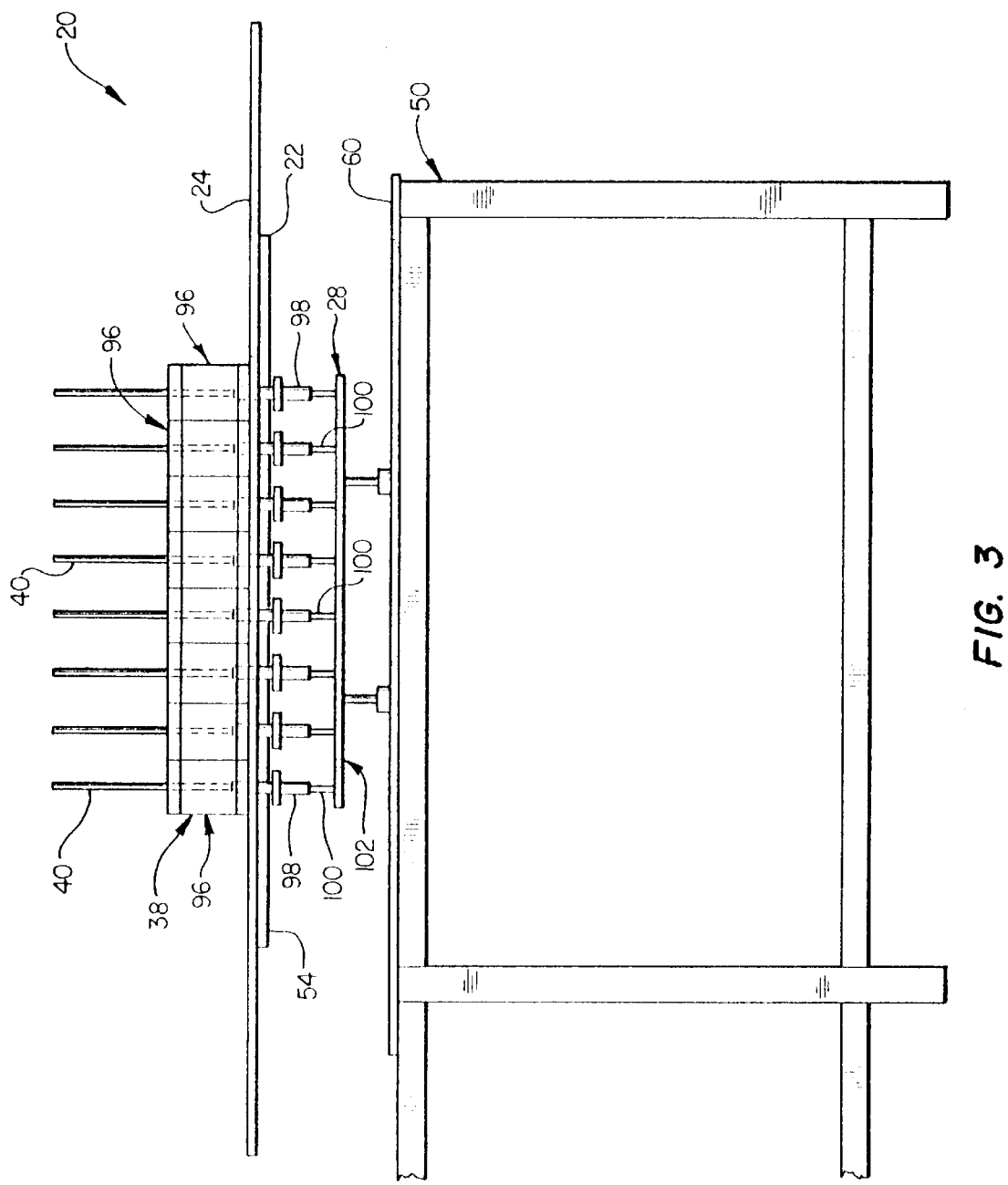
FIG. 3 is a front elevational view of a loading station portion of the tube reforming apparatus, the view being indicated by line 3—3 of FIG. 1.

Referring additionally now to FIG. 3, a front elevational view of the loading station 28 may be seen from a radially outwardly disposed point of reference relative to the apparatus 20. In FIG. 3 the manner in which the tubes 40 are loaded into the apparatus 20 at the loading station 28 may be clearly seen. Portions of the apparatus 20 are not shown in FIG. 3 for illustrative clarity.

Each of the series of tube clamps 38 in the representatively illustrated apparatus 20 includes eight laterally aligned clamp fixtures 96. More or less clamp fixtures 96 may be utilized without departing from the principles of the present invention. The clamp fixtures 96 will be more fully described hereinbelow in the detailed description accompanying FIG. 4.

Each of eight tubes is axially (i.e., vertically as shown in the representatively illustrated loading station 28) loaded into one of the fixtures 96 and axially through a die member, such as male die member 98. Each of the die members 98 is secured to one of the fixtures 96 and laterally aligned with the other die members. An end portion 100 of each tube 40 extends axially and outwardly downward from one of the die members 98. The end portions 100 are the portions of the tubes 40 which will later be reformed in the apparatus 20. A benefit derived from such axially downward extension of the end portions 100 is that, when the end portions become pliable after having been heated, they remain in an axial disposition.

A generally horizontally disposed and generally planar plate 102 is secured to the top side 60 of the frame 50. Since the vertical distance between the table 22 and the frame 50 is constant, and since the clamp fixtures 96 are secured to one of the table extensions 24 and the plate 102 is secured to the frame, the vertical distance between the die members 98 and the plate 102 is also constant. Thus, the eight tubes 40 may be installed in the eight fixtures 96 and conveniently extended downwardly from the eight die members 98 by abutting the end portions 100 against the plate 102.

In this manner, the length of each end portion 100 extending outwardly from a die member 98 may be precisely controlled in the apparatus 20. Such precise control of the lengths of end portions 100 enables significant and unique advances in the mass production of reformed tubes as will become apparent upon further consideration of the detailed description hereinbelow.

After the tubes 40 have been loaded into the fixtures 96 and the lengths of end portions 100 metered by contact with plate 102, the tubes 40 are axially secured to the fixtures. At this point, the table 22 may be rotationally indexed by indexing mechanism 48, displacing the fixtures laterally with respect to the loading station 28. No damage is thus caused to the end portions 100 contacting the plate 102, since such lateral movement of the clamp fixtures 96 is in a direction parallel to the plate 102.

Figure 4:
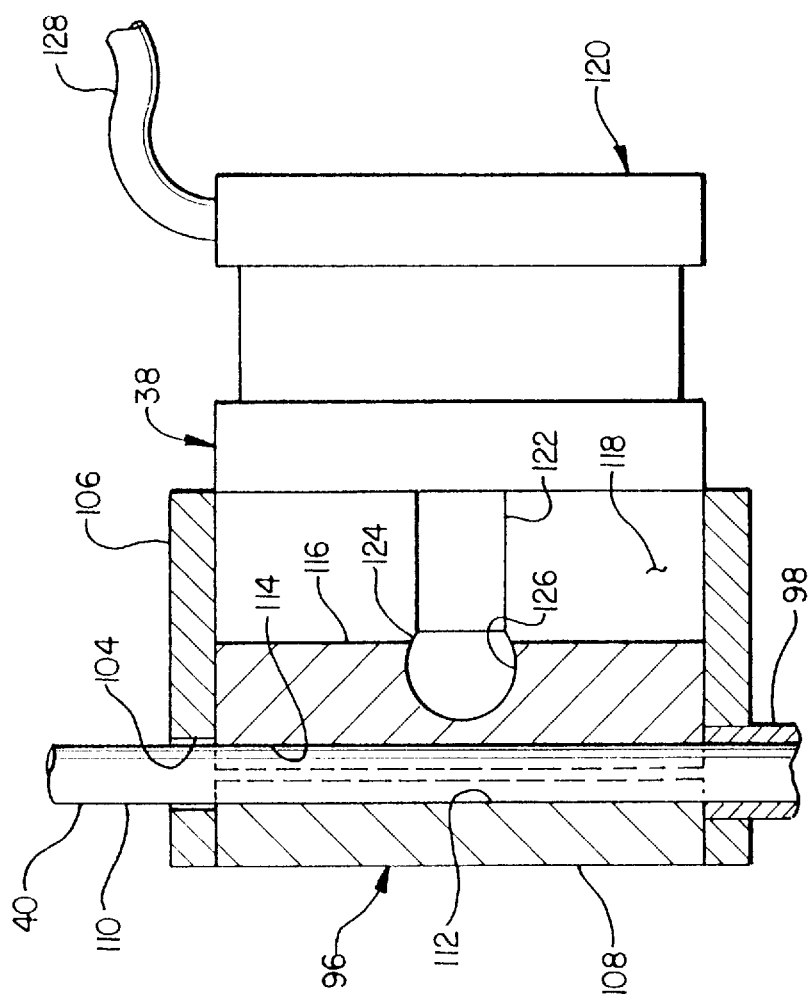
FIG. 4 is a partially cross-sectional view of a tube clamp portion of the tube reforming apparatus, taken along line 4—4 of FIG. 3.
Figure 5:
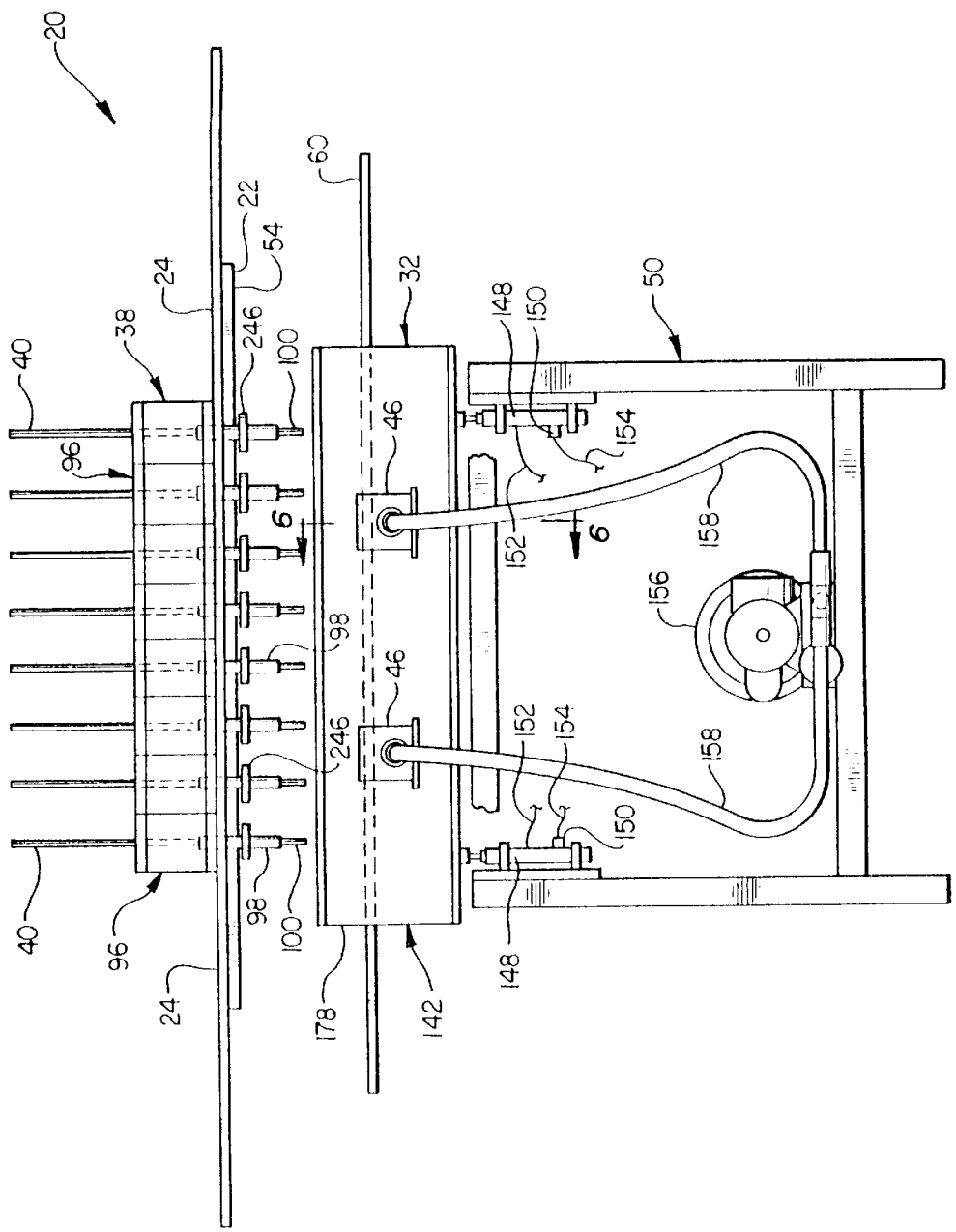
FIG. 5 is a front elevational view of a heating station portion of the tube reforming apparatus, the view being indicated by line 5—5 of FIG. 1.

Referring additionally now to FIG. 4, a partial crosssectional view of one of the clamp fixtures 96 may be seen. Tube 40 extends axially through the fixture 96, passing through an opening 104 formed through a top cover plate 106, adjacent a stationary jaw 108, and axially through die member 98 as previously described. Clamp fixture 96 embodies unique features which permit tube 40 to be axially secured, without undesirably damaging or marring the outer side surface 110 of the tube. Where the tube 40 may be utilized for containing pressurized fluid, such prevention of clamping damage to the tube may also prevent subsequent failure of the tube by rupture or leakage therethrough.

Stationary jaw 108 has a clamping surface 112 formed thereon which is shaped to complementarily engage the outer surface 110 of the tube 40. Thus, if the tube 40 has a circular cross-sectional shape, surface 112 will be complementarily radiused. If, however, tube 40 has a rectangular cross-sectional shape, surface 112 will correspondingly be rectangularly shaped. Note that surface 112 does not completely surround the tube outer surface 110, there being an opposing clamping surface 114 which cooperates with surface 112 to clamp the tube 40 therebetween.

Clamping surface 114 is formed on a laterally slidably disposed clamp member 116. Surface 114 is, similar to surface 112, shaped to complementarily engage the outer surface 110 of the tube 40. Clamp member 116 is disposed laterally intermediate two end plates 118, only one of which is visible in FIG. 4.

An actuator 120 is secured to the end plates 118. A laterally extendable member 122 of the actuator 120 has a radiused pivot member 124 secured to an outer end thereof. The pivot member 124 is cooperatively received in a complementarily shaped recess 126 formed on clamp member 116.

Note that, in the illustrated clamp member 116, recess 126 does not completely enclose the pivot member 124, permitting rotational movement of the clamp member 116 about the pivot member. Thus, when member 122 is laterally extended outwardly from the actuator 120, the clamp member 116 will grippingly engage the tube 40 in cooperation with stationary jaw 108, and the pivot member 124, in cooperation with recess 126, will permit the clamp member 116 to align with the tube outer surface 110. Such alignment of the clamp member 116 and the outer surface 110 enables the stationary jaw 112 and clamp member 116 to more securely grip the tube 40, and helps prevent damage to the tube outer surface 110.

As shown in FIG. 4, pivot member 124 and recess 126 are both more than semicircular, but are not fully circularly shaped. It is to be understood that pivot member 124 and recess 126 may be otherwise shaped, such as spherically shaped, without departing from the principles of the present invention.

Operation of the actuator 120 is automated in the apparatus 20. The following description of the operation of actuator 120 is for the case in which actuator 120 is pneumatic or hydraulic. It will be readily apparent to one of ordinary skill in the art that operation of other actuator types, such as electrical, etc., may be similarly accomplished without departing from the principles of the present invention.

Actuator 120 has a fluid pressure line 128 connected thereto for operation of the actuator. In one mode of operation, fluid pressure may be applied to line 128 to extend member 122 to thereby clampingly engage the tube 40. Line 128 is connected at its other end to a valve 130 (see FIG. 2) mounted to the bottom side surface 54 of the table 22. Fluid pressure is supplied to the valve 130 via line 132 which is connected at its other end to a fluid pressure supply 134 disposed within the pivot member 26. Thus, as table 22 rotates, pressure is continually supplied to the valve 130 via line 132 connected to supply 134.

Valve 130 is operated by means of a pushbutton 136 radially outwardly disposed thereon. Although, with proper modification other types of solenoid valves may be utilized without departing from the principles of the present invention, valve 130 is of the type which is normally open, that is, when pushbutton 136 is extended, valve 130 is open and fluid pressure is supplied to line 128, and when pushbutton 136 is depressed, valve 130 is closed and line 128 is vented to atmosphere. When it is desired to unclamp the tubes 40 in the clamp fixtures 96, pushbutton 136 is depressed by an actuator 138 mounted to the frame 50.

Note that, in the representatively illustrated apparatus 20, there are five such valves 130, one for each of the series of tube clamps 38. When one of the series of tube clamps 38 is initially positioned at the loading station 28, a corresponding one of the valves 130 is radially aligned with the actuator 138 and pushbutton 136 is depressed by the actuator 138. At that point, the valve 130 is off, so that clamp member 116 is retracted and tubes 40 may be loaded into the clamp fixtures 96. After the tubes 40 have been loaded, and just prior to the rotary indexing mechanism 48 rotating the corresponding tube clamps 38 to the next station, actuator 138 is retracted, permitting pushbutton 136 to extend, and thereby opening valve 130 and permitting fluid pressure to flow to the actuator 120 via line 128.

Actuator 138 is connected via line 140 to controller 76, which also controls the rotary indexing mechanism 48. Thus, operation of the loading station 28 is automated. The operator of the apparatus 20 merely loads the tubes 40 in the clamp fixtures 96, and ensures that the tube end portions 100 properly contact the plate 102 as described hereinabove. The tubes 40 are automatically clamped in the corresponding tube clamps 38 and then transported to the next station in sequence. The manner in which the tubes 40 are unclamped from the clamp fixtures 96 will be described hereinbelow in the description directed to the unloading station 36.

Referring additionally now to FIGS. 5, 6, 7, and 8, a radially inwardly directed elevational view of the second heating station 32, a partially cross-sectional view of a heater portion 142 of the heating station, a cross-sectional view of an air distributor portion 144 of the heater portion, and a cross-sectional view of a manifold portion 146 of the air distributor portion may be clearly seen. Portions of the apparatus 20 are not shown in FIGS. 5, 6, 7, and 8 for illustrative clarity.

In the representatively illustrated apparatus 20, the second heating station 32 is similar in construction and operation to the first heating station 30. However, it is to be understood that the heating stations 30,32 may differ in certain respects without departing from the principles of the present invention. Furthermore, the heating stations 30,32 as herein described utilize heated air to heat the end portions 100 of the tubes 40, but other heating means, such as radiant heat, may be utilized without departing from the principles of the present invention.

Applicant prefers that, during the tube heating portion of the tube reforming method described herein, the tube end portions 100 extend vertically downward and the air heated by the heater portion 142 be directed vertically upward, so that the end portions remain axially directed when they become pliable, and so that the heated air may flow evenly about the inner diameters 42 and outer diameters 44 of the tubes 40.

An additional benefit is derived from such orientations of the tube end portions 100 and heater portion 142, in that the end portions 100 tend to radially outwardly expand somewhat when they become pliable, which aids in the forming of the tube end portions between the mating dies as will be more fully described hereinbelow. It is to be understood, however, that other orientations of the end portions 100 and heater portion 142 may be utilized without departing from the principles of the present invention.

When one of the series of tube clamps 38 is positioned at the heating station 32, the heater portion 142 is initially vertically spaced apart from the tube end portions 100. When sensor 84 indicates to the controller 76 that a lock 52 has been engaged by member 62, the heater portion 142 is raised vertically by four actuators 148, only two of which are visible in FIG. 5, so that the heater portion is vertically adjacent and axially aligned with the end portions 100. Just prior to the table indexing mechanism 48 rotating the table 22 so that the series of tube clamps 38 are laterally displaced to the next station in sequence, the heater portion 142 is lowered vertically by the actuators 148.

Such vertical displacement of the heater portion 142 is controlled by the controller 76 which also controls the table indexing mechanism as previously described. Sensors 150 and lines 152 are connected to the actuators 148 and to the controller 76, so that the controller may coordinate vertical displacement of the heater portion 142 with indexing of the table 22. Sensors 150 may be reed switches, are connected to the controller 76 with lines 154, and provide an indication of the vertical position of the heater portion 142. Actuators 148 may be pneumatic or otherwise activated. If fluid pressure is required to activate the actuators 148, lines 152 may have one or more solenoid valves (not shown) connected thereto, as with actuators 58,64,72 of the indexing mechanism 48.

A blower 156 forces a stream of air through two hoses 158 to the air heaters 46 where the stream of air is heated. It will be readily appreciated that the blower 156, heaters 46 and hoses 158 could be integrally formed in a single unit or otherwise configured, but applicant prefers the configuration shown in FIG. 5 and described herein, in order to precisely control the air temperature and reduce the weight carried on the heater portion 142, among other reasons. Other configurations of the heaters 46, hoses 158, and blower 156, or any of them, may be utilized without departing from the principles of the present invention.

Figure 6:
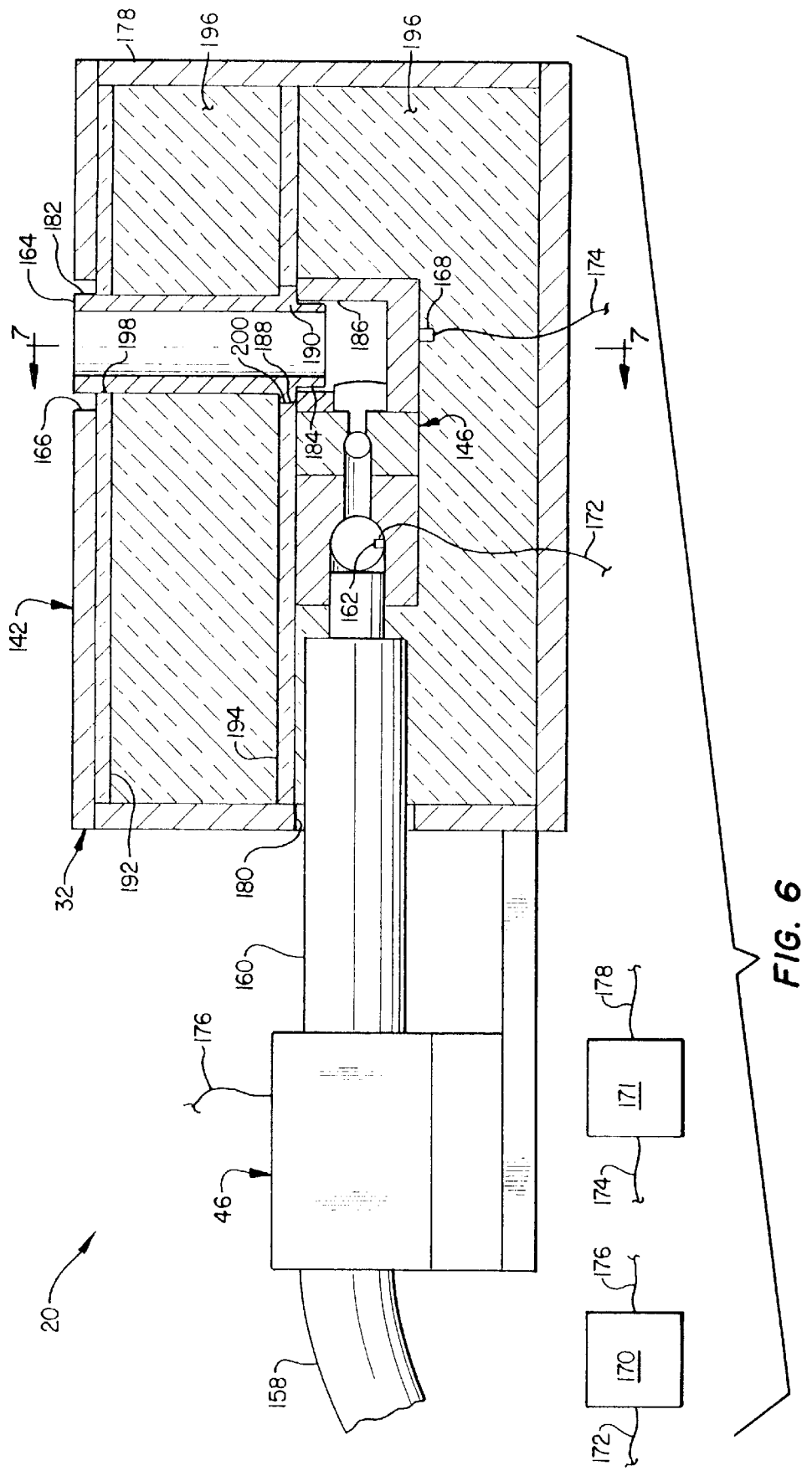
FIG. 6 is a partially cross-sectional view of a heater portion of the heating station, taken along line 6—6 of FIG. 5.

In FIG. 6 it may be seen that each of the heaters 46 is laterally outwardly supported relative to the heater portion 142. The air stream from the blower 156 enters heater 46 via hose 158, is heated by the heater, flows through a conduit 160, flows into the manifold portion 146, and thence vertically upward through a series of laterally spaced apart nozzles 164 which project through a corresponding series of laterally spaced apart openings 166 formed through the heater portion 142.

The manifold 146 has a temperature sensor, such as thermocouple 168, attached thereto for determining the temperature of the manifold, and, additionally, another temperature sensor, such as thermocouple 162, mounted therein for detection of the temperature of the air stream. Although only one such thermocouple 162 is shown in FIG. 6, it is to be understood that applicant prefers that a thermocouple 162 be mounted to detect the temperature of the air stream flowing from each heater 46.

Each thermocouple 162 is connected to a controller, such as temperature controller 170 via line 172. Each heater 46 is also connected to controller 170 via line 176. Controller 170 turns heater 46 on to heat the stream of air when thermocouple 162 indicates that the air is below a desired temperature, and turns the heater off when thermocouple 162 indicates that the air is above a desired temperature. Applicant prefers that the temperature of the air be approximately 385 degrees Fahrenheit for reforming polybutylene tubes 40 in the representatively illustrated apparatus 20, although other air temperatures may be utilized without departing from the principles of the present invention.

Thermocouple 168 senses the temperature of the manifold 146, so that it may be determined when the heater portion 142 has been initially warmed up sufficiently. Thermocouple 168 is connected to a controller 171 via line 174, and the controller 171 is connected to the controller 76 via line 178. It will be readily appreciated that the temperature of the manifold 146 and the temperature of the air may differ substantially when the apparatus 20 is initially operated. Controller 171 is thus connected to controller 76, which is programmed to permit full operation of the apparatus 20 only when the heater portion 142 has been fully warmed up to its operating temperature. The forming station 34, loading station 28, and unloading station 36 are deactivated by controller 76 until the heater portion 142 is at its operating temperature, but the indexing mechanism 48 is operational during the heater portion warming up period, so that the heated air stream does not impinge on a single one of the series of tube clamps 38 for an extended period of time.

The heater portion 142 also includes a box-like container 178. Openings 166 and an opening 180 for each of the heater conduits 160 are formed through walls of the container 178. Note that openings 166 are somewhat larger than an upper outer diameter 182 of each of the nozzles 164 which extend vertically therewithin. This reduces heat transfer from nozzles 164 to the container 178. As will be more fully described hereinbelow, the nozzles 164 are laterally supported in a manner which prevents lateral displacement of the nozzles as the heater portion 142 warms up.

A lower outer diameter 184 of each of the nozzles 164 is received in a corresponding one of a laterally spaced apart series of upwardly directed openings 186 formed on the manifold 146. Similar to openings 166 of container 178, openings 186 are somewhat larger than diameters 184 to permit lateral displacement therebetween as the temperature of the heater portion 142 varies. An intermediate outer diameter 188 is formed on each of the nozzles 164, and a radially extending shoulder 190 thereby defined between diameters 188 and 184 vertically upwardly supports the nozzle relative to the manifold 146, diameter 188 being larger than opening 186. Diameter 188 may be integrally formed on each of nozzles 164, or may be formed by, for example, press-fitting a suitably configured and separately formed ring thereon.

Lateral support for the nozzles 164 is provided by thermally dimensionally stable plates 192 and 194 disposed within container 178. Outer edges of the plates 192 and 194 complementarily conform to the inner profile of the container 178 and are thereby laterally secured therein. Insulation, such as fiberglass batting 196, fills the remainder of the container 178, restricting heat loss therefrom. Plates 192 and 194 are made of a material, such as fiberglass, which has a very low coefficient of thermal expansion. Thus, although the manifold 146 may expand significantly when heated, the plates 192 and 194 remain dimensionally stable, restricting lateral displacement of each of the series of nozzles 164 relative to the other nozzles.

Plate 192 has a laterally spaced apart series of vertically extending openings 198 formed therethrough, the openings being cooperatively shaped to slidingly receive the upper diameter 182 of the nozzles 164 therein. Plate 194, likewise, has a laterally spaced apart series of vertically extending openings 200 formed therethrough cooperatively shaped to slidingly receive the lower diameter 188 of the nozzles 164 therein. The utilization of vertically spaced apart plates 192 and 194 aids in maintaining the vertical orientation of the nozzles 164, so that they may each be accurately axially aligned with the tube end portions 100.

Figure 7:
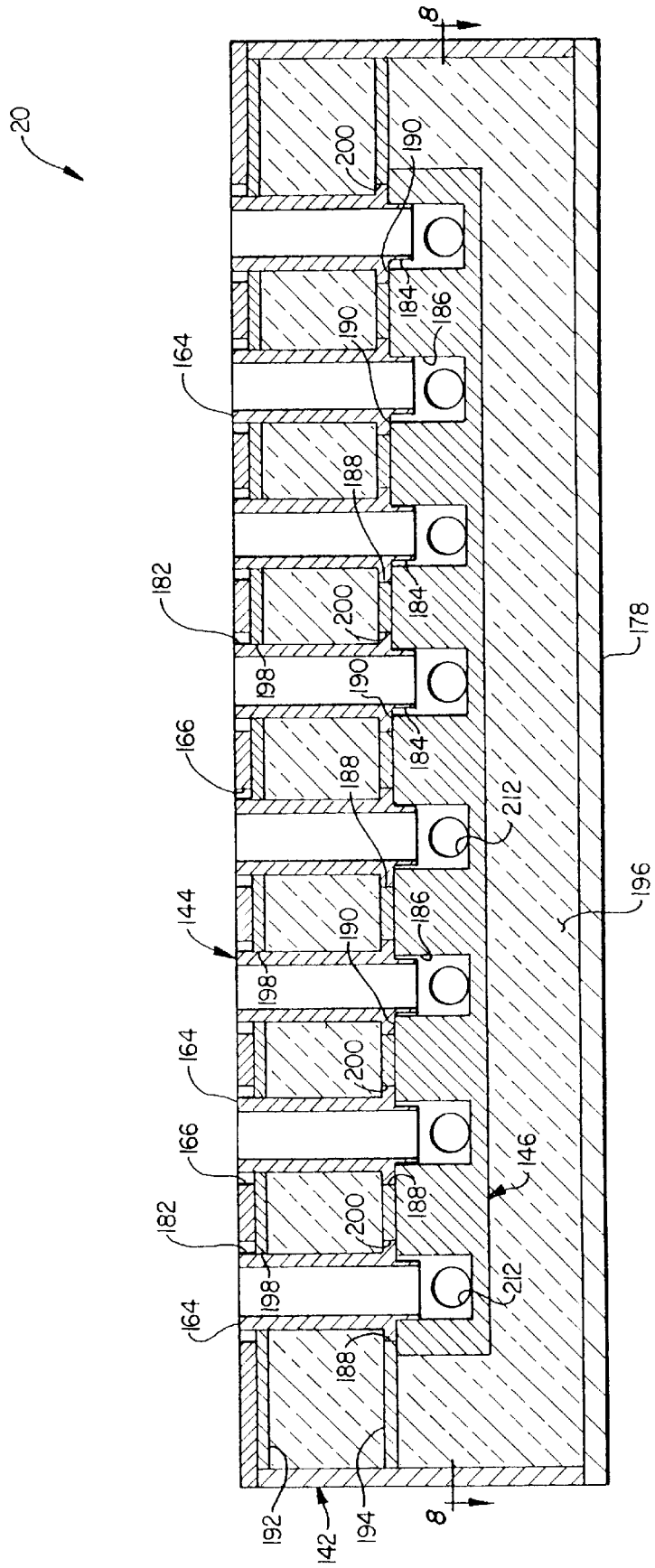
FIG. 7 is a cross-sectional view of a heated air distribution portion of the heater, taken along line 7—7 of FIG. 6.

Referring specifically now to FIG. 7, the manner in which the plates 192 and 194 laterally align the nozzles 164 may be clearly seen. Each of the series of eight nozzles 164 is laterally restrained by the plates 192 and 194 with respect to the other nozzles and, thus, the lateral spacing of the series of nozzles 164 will not vary substantially as the heater portion 142 warms up.

Figure 8:
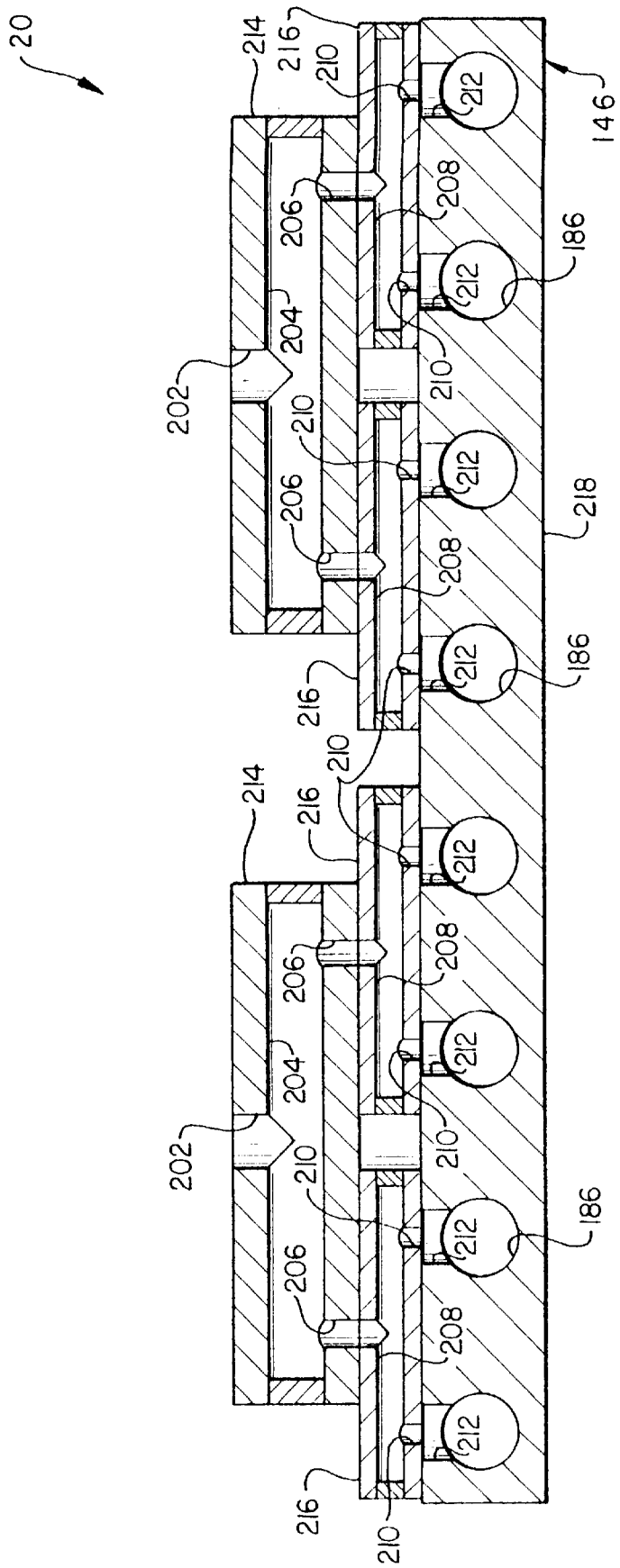
FIG. 8 is a cross-sectional view of a manifold portion of the heater, taken along line 8—8 of FIG. 7.

Referring specifically now to FIG. 8, a cross-sectional view of the manifold 146 may be clearly seen. Manifold 146 is configured to accurately distribute the stream of air equally to each of the series of nozzles 164. Air from the conduit 160 enters the manifold 146 at openings 202. Openings 202 intersect a lateral air passageway 204, which communicates with openings 206. Each of openings 206, in turn, communicates with a lateral air passageway 208 which communicates with openings 210. Each of openings 210 communicates, via an opening 212, with one of the series of openings 186.

Note that, in the illustrated embodiment of the present invention, air flow from each of the lateral air passageways 204 and 208 is restricted by the openings 206 and 210, respectively, leading therefrom. In other words, lateral air passageways 204 and 208 have less restriction to air flow therethrough than do openings 206 and 210, respectively. This result is accomplished by making the diameters of openings 206 and 210 equal to one-half the diameters of air passageways 204 and 208, respectively. Thus, the combined flow area through openings 206 is approximately one-half the flow area through a corresponding one of air passageways 204, and the combined flow area through openings 210 is approximately one-half the flow area through a corresponding one of air passageways 208. Air passageways 204 and 208 thereby serve as plenums, permitting air flow through corresponding openings 206 and 210, respectively, to be equalized. Other configurations of air passageways and openings may be utilized without departing from the principles of the present invention.

Openings and air passageways 186,202,204,206,208,210, 212 of manifold 146 are formed on intersecured blocks 214,216,218. Applicant prefers this manner of constructing manifold 146 for ease of manufacture, but it is to be understood that manifold 146 may be otherwise constructed, such as integrally formed, without departing from the principles of the present invention. Additionally, manifold 146 is shown as being generally horizontally disposed within the heater portion 142, with inlet openings 202 being orthogonal to outlet openings 186, but it is to be understood that the inlet and outlet openings may be otherwise directed without departing from the principles of the present invention. For example, if heaters 46 were disposed vertically beneath the container 178, inlet openings 202 could be vertically downwardly directed and manifold 146 could be generally vertically disposed within the container.

Figure 9:
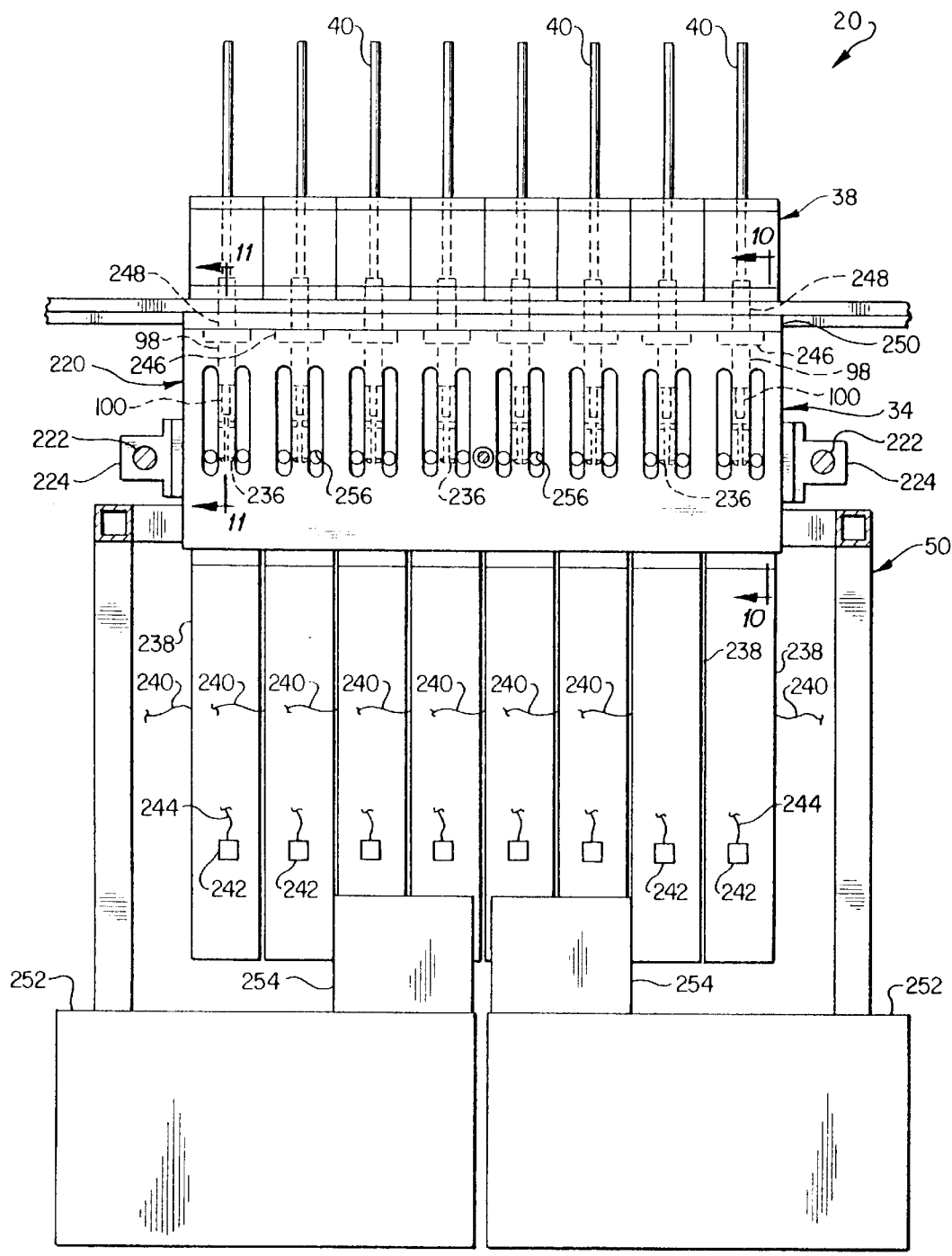
FIG. 9 is a front elevational view of a forming station portion of the tube reforming apparatus, the view being indicated by line 9—9 of FIG. 1.
Figure 10:
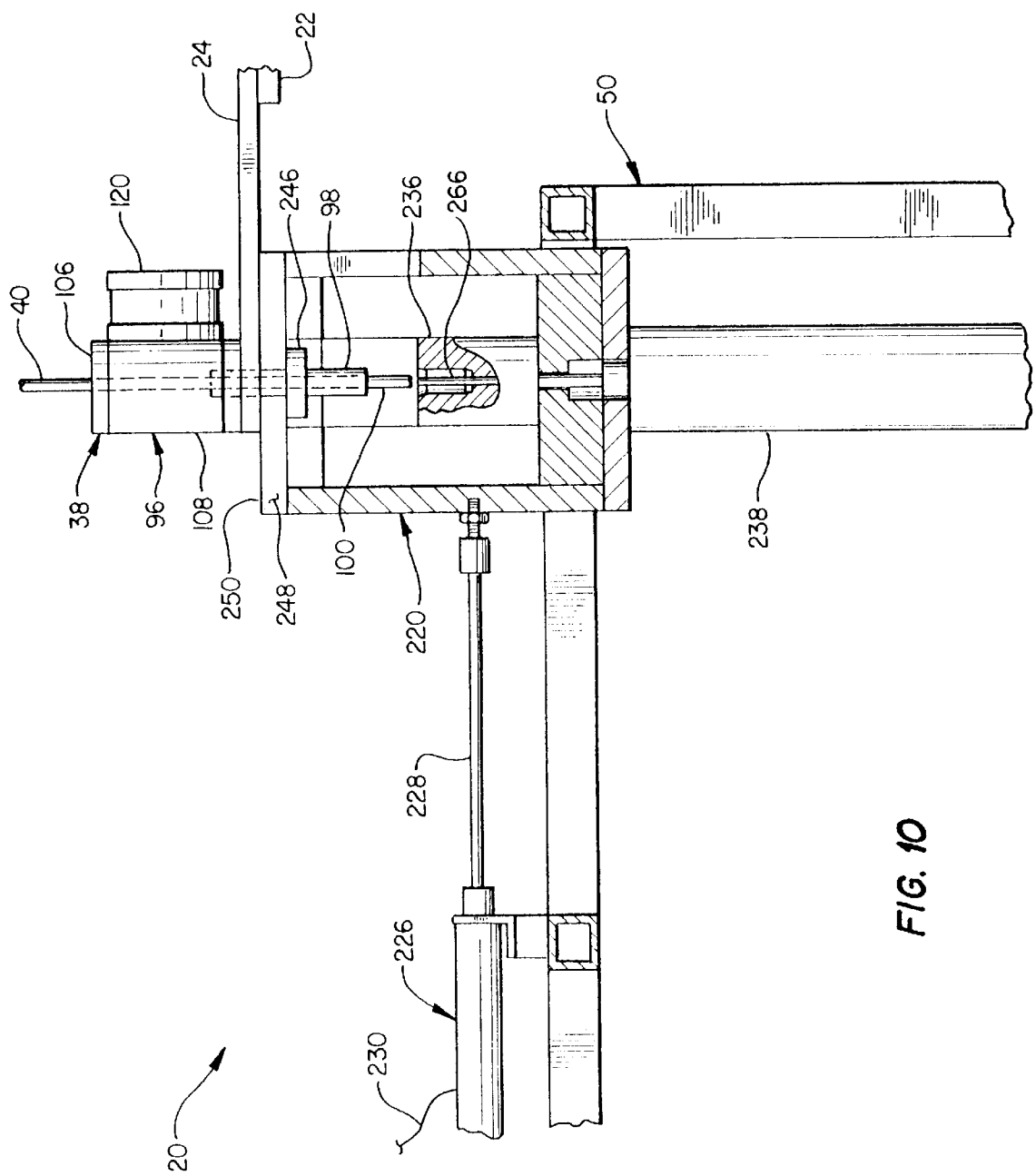
FIG. 10 is a partially cross-sectional view of the forming station, taken along line 10—10 of FIG. 9.

Referring additionally now to FIGS. 9 and 10, the forming station 34 may be seen from a radially inwardly directed front elevational view, and from a partially cross-sectional side elevational view thereof, respectively. Portions of the apparatus 20 are not shown in FIGS. 9 and 10 for illustrative clarity.

The forming station 34 includes a radially inwardly (i.e., laterally) displaceable carriage 220 which is carried on two laterally spaced apart rails 222 secured to the frame 50. Linear bearings 224 are secured to the carriage 220 at opposite ends thereof. The carriage 220 is, thus, laterally displaceable between a first position in which the carriage is laterally spaced apart from one of the series of tube clamps 38 positioned at the forming station 34, and a second position in which the carriage is axially aligned with the tube clamps. FIG. 1 shows the carriage 220 in its laterally spaced apart first position, and FIG. 10 shows the carriage in its axially aligned second position.

The carriage 220 is laterally displaced by means of an actuator 226 mounted to the frame 50 and having a laterally extendable member 228 attached to the carriage. Actuator 226 is connected to the controller 76 via line 230 for controlling extension of the member 228. Actuator 226 may be of similar construction to actuators 58,64,72,120,138, 148, or any of them, or may be otherwise configured without departing from the principles of the present invention.

A position sensor, such as reed switch 232, is connected to the controller 76 via line 234 for indication of the position of the member 228. The controller 76 is programmed to activate the actuator 226 to extend the member 228 just after one of the series of tube clamps 38 is positioned at the forming station 34, sensor 84 indicating that a lock 52 has been engaged by member 62, and to retract the member before the tube clamps are laterally displaced to the next station in sequence by the rotary indexing mechanism 48. Controller 76 will not permit rotation of the table 22 by the rotary indexing mechanism 48 while sensor 232 indicates that the carriage 220 is not in its second, laterally spaced apart, position.

When actuator 226 causes carriage 220 to displace laterally inward, the downwardly extending male die members 98 are received in the carriage and axially aligned with a series of laterally spaced apart female die members 236. When the sensor 232 indicates to the controller 76 that the carriage 220 is in its second position, a laterally spaced apart series of actuators 238 attached to the carriage and to the female die members 236 are activated to vertically upwardly displace the female die members to cooperatively engage the male die members 98, and thereby form the pliable tube end portions 100 therebetween. Actuators 238 may be of similar construction to any of the previously described actuators 58,64,72,120,138,148, 226 or any of them, or may be otherwise configured without departing from the principles of the present invention.

Each one of actuators 238 is connected to the controller 76 via a line 240, and each actuator has a sensor mounted thereon, such as reed switch 242, for sensing the position of the actuator, which is connected to the controller via a line 244. Controller 76 is programmed to extend each of actuators 238 after sensor 232 indicates that the carriage is axially aligned with one of the series of tube clamps 38 positioned at the forming station 34. Each of actuators 238 are then retracted after a predetermined period of time during which the tube end portions 100 have been formed by the mating dies 98,236. Controller 76 will not permit actuator 226 to retract the carriage 220 laterally while any of sensors 242 indicate that any of the actuators 238 are extended.

Applicant prefers utilizing a separate actuator 238 for each mating die pair 98,236, so that each tube end portion 100 may be individually formed. This is of particular benefit in the representatively illustrated apparatus 20 due to the manner in which the end portions 100 are formed in the die pairs 98,236. As will be described in further detail hereinbelow, apparatus 20 is capable of forming end portions 100 of variable volume between die pairs 98,236. It is, thus, advantageous to independently control the mating engagement of the die pairs 98,236 as will be readily apparent upon consideration of the detailed description hereinbelow.

Note that each of male die members 98 has a radially enlarged flange 246 formed thereon, which is vertically downwardly spaced apart from the table extension 24. When the actuator 226 laterally displaces the carriage 220 to its second, axially aligned, position, each of male die members 98 is received in a laterally slotted opening 248 formed on a top side 250 of the carriage. Thus, the flanges 246 are vertically downwardly supported by the carriage top side 250 so that when the actuators 238 vertically upwardly displace the female die members 236 into mating engagement with the male die members 98, the cooperative engagement between the flanges and the carriage top side prevent vertically upward displacement of the male die member.

Positioned adjacent the frame 50 are coolant reservoirs 252 and coolant pumps 254. Female die members 236 are cooled by pumping coolant from the reservoirs 252 to openings 256 which permit coolant to circulate through the female die members.

Referring additionally now to FIG. 11, a cross-sectional view of one of the mating die pairs 98,236 forming one of the tubes 40 therebetween may be clearly seen. As previously described, when the tubes 40 are disposed at the forming station 34, end portions 100 are pliable due to being heated at prior stations 30 and 32.

When a female die member 236 is vertically upwardly displaced by one of the actuators 238, end portion 100 is deformed, and, thereby, reformed between the male die member 98 and the female die member 236. In the representatively illustrated mating die pair 98,236, the male die member has a generally planar, laterally disposed, and annular shaped surface 258 formed thereon which, in turn, forms a radially extending shoulder 260 on the end portion 100. The female die member 236 has a radially sloping and generally conically shaped surface 262 formed thereon which, in turn, forms a complementarily shaped surface 264 on the end portion 100, and which may be used to seal the tube 40 to a plumbing fixture, etc., (not shown).

It may now be fully appreciated that the above-described apparatus 20, and, in particular, the mating engagement of the die pairs 98,236, is capable of compensating for varying volume end portions 100. As the volume of the tube end portions 100 varies, due variously to changing inner diameters 42 and or outer diameters 44, etc., the unique construction of the forming station 34 and the mating die pairs 98,236 permit the axial distance, denoted as "A" in FIG. 11, to vary accordingly. Thus, when the volume of an end portion 100 increases, dimension A correspondingly increases, and when the volume decreases, dimension A also decreases. Such variation of dimension A is inconsequential as long as a plumbing fixture (not shown), etc., is properly designed to compensate for such variation by, for example, providing a threaded coupling which may be tightened more or less into the fixture.

It may now also be fully appreciated that, in the representatively illustrated apparatus 20, each die pair 98,236 is provided with a corresponding actuator 238. Since the volume of each end portion 100 may vary, it is advantageous to independently engage each die pair. However, it is to be understood that all die pairs 98,236 could be engaged utilizing more or fewer actuators 238 without departing from the principles of the present invention.

Note that an inner axially upwardly extending pin 266 enters the tube inner diameter 42 when the die pair 98,236 is engaged. The pin 266 prevents radially inward compression of the tube inner diameter 42 when the end portion 100 is reformed. It is a particular advantage of the present invention that it is not necessary for the pin 266 to be inserted into the inner diameter 42 until the end portion 100 is reformed between the die pair 98,236. Furthermore, it may now be fully appreciated that the radially outward expansion of the tube end portion 100 at the heating stations 30 and 32 permits the pin 266 to be easily inserted into the inner diameter 42.

When the tube end portions 100 have been reformed at the forming station 34, the controller 76 activates the actuators 238 to vertically downwardly retract the female die members 236. When the sensors 242 indicate that the actuators 238 are retracted, the controller 76 activates the actuator 226 to laterally outwardly retract the carriage 220. When the sensor 232 indicates that the actuator 226 is retracted, the controller 76 permits the series of tube clamps 38 to be displaced to the next station in sequence by the rotary indexing mechanism 48.

The next station in sequence after the forming station 34 is the unloading station 36. Referring specifically now to FIG. 2, the solenoid valve 130 corresponding to the series of tube clamps 38 securing the end portions 100 which have just previously been reformed at the forming station 34 is now positioned radially inward of an actuator 268 mounted to the frame top side 60. Actuator 268 may be of similar construction to any of the previously described actuators, or any of them, or may be differently configured without departing from the principles of the present invention.

The actuator 268 is connected to the controller 76 via line 270. When the tube clamps 38 are positioned at the unloading station 36, sensor 84 indicating that a lock 52 has been engaged by member 62, controller 76 activates the actuator 268 to extend and depress the corresponding pushbutton 136 of the solenoid valve 130, thereby turning the valve 130 off and venting the fluid pressure in the line 128 connected to the corresponding actuators 120, and thereby removing the clamping force exerted on the tubes 40. After the tubes 40 have been unloaded, and just prior to the rotary indexing mechanism 48 rotating the corresponding tube clamps 38 to the next station, actuator 268 is retracted, permitting pushbutton 136 to extend, and thereby opening valve 130 and permitting fluid pressure to flow to the actuator 120 via line 128.

In the representatively illustrated apparatus 20, actuators 120 are of the spring return type, whereby members 122 are biased to retract when fluid pressure is removed from lines 128. However, it is to be understood that actuators 120 may be otherwise configured, for example, such that fluid pressure is required to retract members 122, in which case another line may be connected to solenoid valve 130 for that purpose.

In an alternate embodiment of the present invention, male die member 98 may be vertically split, one portion of the male die member being attached to the clamping member 116, so that the male die member opens when the member 122 retracts. In that case, tubes 40 having an end portion opposite to end portion 100 which is radially enlarged may be removed from the fixture 96 and male die 98 after end portion 100 has been reformed.

The foregoing detailed description is to be clearly understood as being given by way of illustration and example only, the spirit and scope of the present invention being limited solely by the appended claims.

What is claimed is:

1. Apparatus for reforming an end portion of a tube, the apparatus comprising:

a first structure;

a second structure attached to said first structure such that the distance between said first and second structures is constant;

means for displacing said second structure in a parallel direction relative to said first structure;

a first die mounted to said second structure, said first die being capable of axially receiving the tube therein;

a clamping device mounted to said second structure, said clamping device being capable of axially securing the tube relative to said first die;

a loading station having a surface attached to said first structure, said surface being axially spaced apart from, and axially aligned with, said first die when said displacing means displaces said second structure so that said first die is at said loading station;

a first heating station having a means for heating the tube end portion attached to said first structure, said heating means being axially aligned with said first die when said displacing means displaces said second structure so that said first die is at said heating station; and a forming station having an axially displaceable second die attached to said first structure, said second die being axially aligned with said first die, and said second die being capable of cooperatively engaging said first die to reform the tube end portion therebetween, when said displacing means displaces said second structure so that said first die is at said forming station.

2. The apparatus according to claim 1, further comprising an unloading station separate from said loading station, the unloading station having an actuator attached to said first structure, said actuator cooperatively engaging said clamping device to release the tube for axial movement relative to said first die when said displacing means displaces said second structure so that said first die is at said unloading station.

3. The apparatus according to claim 2, wherein said unloading station is positioned between said forming station and said loading station.

4. The apparatus according to claim 1, wherein said heating means forces air at an elevated temperature about interior and exterior surfaces of the tube end portion.

5. The apparatus according to claim 1, wherein said clamping device is capable of securing the tube in a vertical orientation, such that the tube end portion extends downwardly when said first die is at said heating station.

6. The apparatus according to claim 1, wherein said heating means includes a forced air manifold, said manifold being capable of directing air at an elevated temperature toward said first die when said first die is at said first heating station.

7. The apparatus according to claim 1, wherein said heating means is axially positionable relative to said first die in a selected one of first and second positions, said heating means being configured to automatically displace to said first position after said first die is displaced to said first heating station, and said heating means further being configured to automatically displace to said second position prior to said first die being displaced from said first heating station.

8. The apparatus according to claim 1, further comprising a second heating station attached to said first structure.

9. The apparatus according to claim 8, wherein said second heating station is disposed between said first heating station and said forming station.

10. The apparatus according to claim 1, wherein said first heating station is configured to heat a plurality of the tube end portions simultaneously.

11. The apparatus according to claim 1, wherein said heating means is capable of directing each of a plurality of forced heated air streams toward one of a plurality of the tube end portions.

12. The apparatus according to claim 1, wherein said forming station further has a plurality of said second dies, each of said second dies being positioned to cooperatively engage one of a plurality of said first dies, corresponding ones of said first and second dies forming a plurality of die sets.

13. The apparatus according to claim 12, wherein each of said plurality of die sets is configured to simultaneously reform one of a plurality of the tube end portions.

14. The apparatus according to claim 12, wherein each of said plurality of second dies is operatively attached to one of a plurality of actuators, and wherein each of said actuators is capable of displacing one of the plurality of second dies toward a corresponding one of the plurality of first dies.

15. The apparatus according to claim 14, wherein said actuators are capable of simultaneously and independently displacing the second dies toward the first dies.

16. The apparatus according to claim 15, wherein each of said second dies is configured to cooperatively engage one of said first dies and form a variable axial thickness radially enlarged portion on a corresponding one of the tube end portions reformed therebetween, each of the enlarged portions varying in proportion to a volume of its corresponding tube end portion.

17. The apparatus according to claim 1, wherein said second die is configured to engage said first die and form a variable axial thickness radially enlarged portion on the tube end portion.

18. Apparatus for reforming respective end portions of a plurality of tubes, the apparatus comprising:
a first structure;
a second structure attached to said first structure;
a displacement device attached to said first and second structures, said displacement device being configured to displace said first structure equidistantly relative to said second structure;
a plurality of first dies mounted to said second structure, each of said first dies being capable of axially receiving one of the tubes therein;
a plurality of clamping devices mounted to said second structure, each of said clamping devices being capable of axially securing one of the tubes relative to a corresponding one of said first dies;
a loading station having a surface attached to said first structure, said surface being axially spaced apart from, and axially aligned with, said first dies when said displacement device displaces said second structure so that said first dies are at said loading station;
a first heating station having a heating device attached to said first structure, said heating device being axially aligned with said first dies when said displacement device displaces said second structure so that said first dies are at said heating station; and
a forming station having an axially displaceable plurality of second dies attached to said first structure, each of said second dies being axially aligned with a corresponding one of said first dies, and each of said second dies being capable of cooperatively engaging said corresponding first die to reform a corresponding one of the tube end portions therebetween, when said displacement device displaces said second structure so that said first dies are at said forming station.

19. The apparatus according to claim 18, further comprising an unloading station separate from said loading station, the unloading station having an actuator attached to said first structure, said actuator cooperatively engaging said clamping devices to release the tubes for axial movement relative to said first dies when said displacement device displaces said second structure so that said first dies are at said unloading station.

20. The apparatus according to claim 19, wherein said unloading station is positioned between said forming station and said loading station.

21. The apparatus according to claim 18, wherein said heating device forces air at an elevated temperature about respective interior and exterior surfaces of the tube end portions.

22. The apparatus according to claim 18, wherein said clamping devices are capable of securing the tubes in a vertical orientation, such that the tube end portions extend downwardly when said first dies are at said heating station.

23. The apparatus according to claim 18, wherein said heating device includes a forced air manifold, said manifold being capable of directing air at an elevated temperature toward each of said first dies when said first dies are at said first heating station.

24. The apparatus according to claim 18, wherein said heating device is axially positionable relative to said first dies in a selected one of first and second positions, said heating device being configured to automatically displace to said first position after said first dies are displaced to said first heating station, and said heating device further being configured to automatically displace to said second position prior to said first dies being displaced from said first heating station.

25. The apparatus according to claim 18, further comprising a second heating station attached to said first structure.

26. The apparatus according to claim 25, wherein said second heating station is disposed between said first heating station and said forming station.

27. The apparatus according to claim 18, wherein said first heating station is configured to heat the tube end portions simultaneously.

28. The apparatus according to claim 18, wherein said heating device is capable of directing each of a plurality of forced heated air streams toward a corresponding one of the tube end portions.

29. The apparatus according to claim 18, wherein said corresponding ones of said first and second dies form a plurality of die sets.

30. The apparatus according to claim 29, wherein each of said plurality of die sets is configured to simultaneously reform a corresponding one of the tube ends.

31. The apparatus according to claim 29, wherein each of said plurality of second dies is operatively attached to one of a plurality of actuators, and wherein each of said actuators is capable of displacing one of the plurality of second dies toward a corresponding one of the plurality of first dies.

32. The apparatus according to claim 31, wherein said actuators are capable of simultaneously and independently displacing the second dies toward the first dies.

33. The apparatus according to claim 32, wherein each of said second dies is configured to cooperatively engage one of said first dies and form a variable axial thickness radially enlarged portion on a corresponding one of the tube end portions reformed therebetween, each of the enlarged portions varying in proportion to a volume of its corresponding tube end portion.

* * * * *